United States Patent [19]
Wilen

[11] Patent Number: 6,109,453
[45] Date of Patent: Aug. 29, 2000

[54] PORTABLE TELEVISION CHANNEL SELECTION STATION WITH CHANNEL DESIGNATOR

[76] Inventor: Richard Wilen, c/o Premium Channels Publishing, Inc., 135 Oval Dr., Islandia, N.Y. 11722

[21] Appl. No.: 08/832,138

[22] Filed: Apr. 7, 1997

[51] Int. Cl.[7] .................................................. A47F 7/00
[52] U.S. Cl. .................. 211/26.1; 211/42; 248/205.2
[58] Field of Search .................. 211/13.1, 26.1, 211/42, 45; 281/15.1; 248/205.2

[56] References Cited

U.S. PATENT DOCUMENTS

| | | | |
|---|---|---|---|
| 4,610,054 | 9/1986 | Malian | 248/205.2 X |
| 4,991,817 | 2/1991 | VonKleist et al. | 248/205.2 X |
| 5,042,670 | 8/1991 | Timberlake | 211/26.1 X |
| 5,082,229 | 1/1992 | Dahl | 248/205.2 X |
| 5,269,484 | 12/1993 | Jones | 248/205.2 X |
| 5,348,347 | 9/1994 | Shink | 281/15.1 X |
| 5,647,486 | 7/1997 | Wilen | 211/26.1 |

Primary Examiner—Robert W. Gibson, Jr.
Attorney, Agent, or Firm—Stephen E. Feldman, P.C.

[57] ABSTRACT

The instant invention provides a television channel selection station. The station includes a substantially rectangular planar member, an arrangement for attaching a program schedule guide having a column of television station call letter designation data indicia along the at least one page edge of it, opposite the folds of the guide, to the member, a channel designator on the station but separate from the member, but designed to slidably engage relative to the member in a left or right dimensional displacement, and/or up or down dimensional displacement, positioned to the right, of an attached program schedule guide; and, a scheme for attaching a remote control to the member.

20 Claims, 1 Drawing Sheet

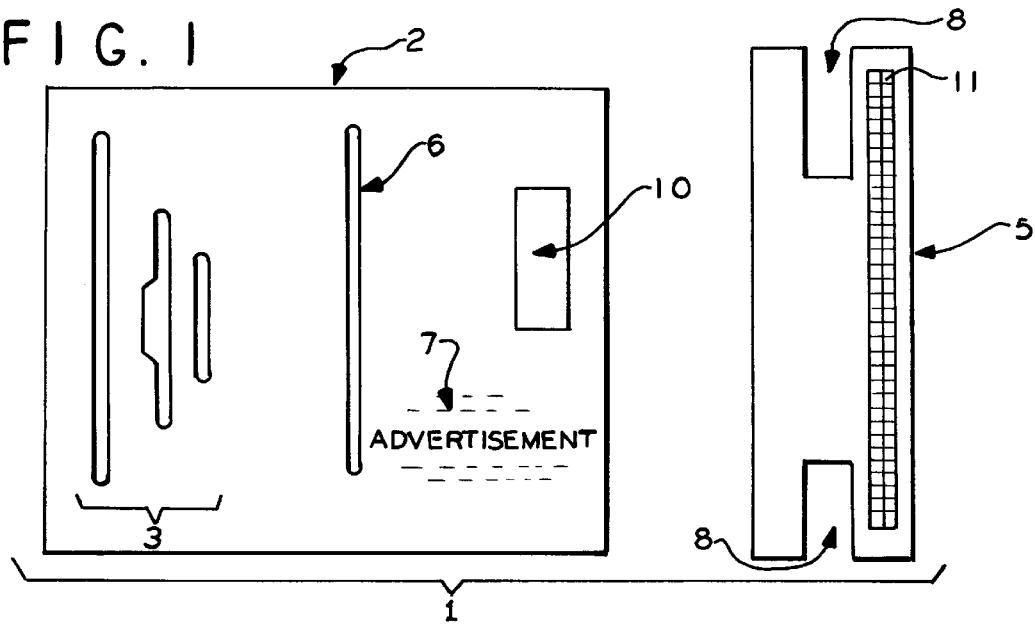
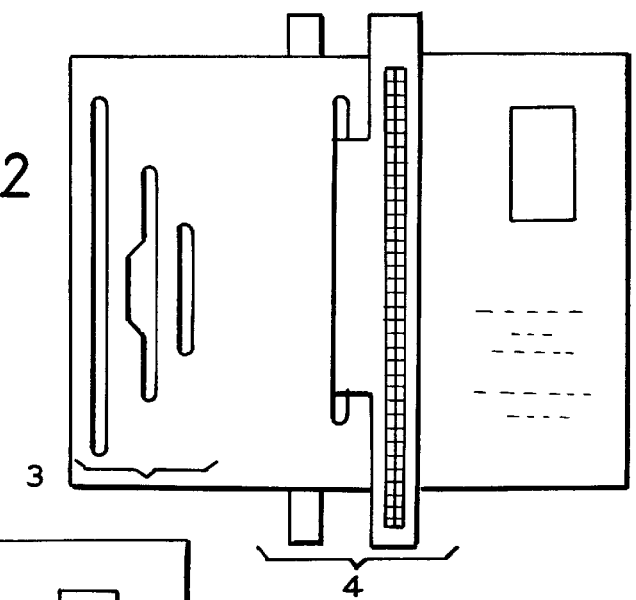
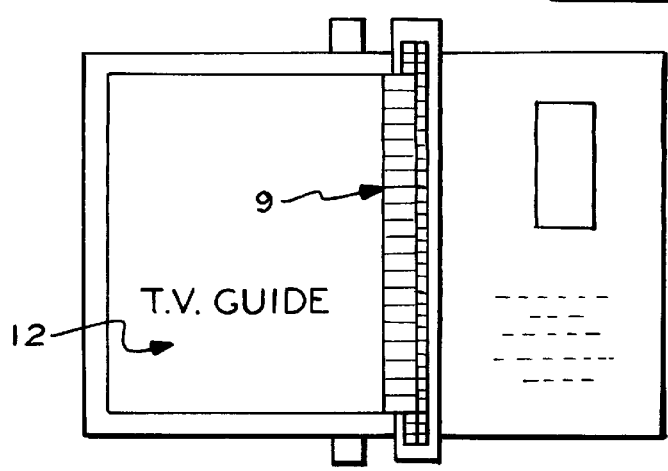

PORTABLE TELEVISION CHANNEL SELECTION STATION WITH CHANNEL DESIGNATOR

BACKGROUND OF THE INVENTION

This invention relates to aids and apparatus for television channel selection and has particular utility for use as an aid to the viewer having a television receiver having a large number of available television channels.

In its broadest embodiment, the invention contemplates a compact portable station which ensures the proximity of a remote control device (hereinafter "RC") to a television program schedule guide. Specifically the instant invention provides a portable television channel selection station with a novel channel designator incorporated into it.

In recent years, remote-controllable entertainment and other electronic appliances, such as televisions, video cassette recorders ("VCR's"), audio receivers, etc., have proliferated. Each of these appliances can be controlled (i.e., turned on and off, programmed, tuned, and the like) by a remote-controlled (RC) device, which usually is a small box with an infra-red transmitter inside and various switches on a top surface of it, for controlling the transmitter and causing it to transmit selected codes to the appliance.

The users of such appliances, usually keep their RC units on a low table in front of a sofa, on an arm of a sofa, on a bedside night table, etc. However, as is the usual case, when a user owns several appliances which employ an RC unit, the viewer must store each respective RC unit in a place and manner so as not to cause confusion between it and RC units for other appliances which the viewer might have. Storage of several RC units in any of the aforementioned places, thus presents a problem since the respective, individual RC units tend to become confused among the others and/or lost under other equipment, sofa cushions, books, papers, and the like.

In addition to this problem, users of such RC units typically keep a schedule of entertainment programs and other reference materials, such as television guidebooks, cable guidebooks, satellite television guidebooks, and the like, in proximity to their respective RC units. Thus, the problem presented by the storage and retrieval of these printed materials tends to compound the posed by plural RC units.

Various schemes have been proposed to secure a RC to a fixed position to provide certainty of access to it by a viewer.

In U.S. Pat. No. 5,485,359 to Galvin, a remote control holder and illumination device, for a remote control having a keypad has a base, an illumination member and a mirror housing adjustment member. The base has a guide passage therein. A fastening member is attached to the upper surface of the base to fasten the base to the remote control. The illumination member has a support frame slidingly attached to the base. A mirror housing is connected to the support frame. A convex mirror is attached to the mirror housing. The mirror may be curved in a convex or concave manner. A mirror housing adjustment member has a guide tab, connected to the support frame, that traverses the guide passage. An actuation member extends through the guide passage to allow the user to adjust the position of the mirror housing along the length of the base.

In U.S. Pat. No. 4,815,683 to Ferrante, a holder for TV/VCR remote control unit is generally rectangular and has one or two remote control unit receiving compartments. Variously shaped spacer brackets can be used to attach the holder to a support surface such as the housing of a TV or VCR. Advantageously, resilient members, such as springs or foam pads are placed into the receiving compartments to selectively elevating the remote control units above the holder to facilitate gripping and provide protection to the units against mechanical shock.

In U.S. Pat. No. 4,848,609 to Meghnot, an adjustable device for holding together any two remote television (TV), stereo and video cassette recorder (VCR) monitor control units. The device consists of two interconnecting pieces having sides with gripping means for firmly holding the monitors in place, bottom portions which interconnect by tongue and groove means and upper portions having matching teeth and grooves for adjustably interconnecting the two pieces to hold any two sizes of controls. The device can be easily held in one hand, thereby leaving the other hand free to operate the TV, stereo and VCR remote control units at the same time. This device prevents remote control units from being misplaced and protects said units from damage due to dropping.

In U.S. Pat. No. 4,893,222 to Mintzer, an illumination device for use with a hand-held remote control unit comprising a base and a projection extending from the base and the projection is exposed to a space formed by the base and contains an illumination source which is directed toward the space. The space is configured to accommodate receipt of at least a portion of the hand-held remote control unit in the space so as to return the hand-held remote control unit in a position to subject a selected surface thereof to the illumination source for facilitating illumination thereof while permitting actuation and operation of the hand-held remote control unit.

In U.S. Pat. No. 4,852,746 to Wells, et al, a remote control unit orientation and storage device (18) includes four wall members (20A, 20B, 20C, and 20D) that define both a plurality of open cells (84A, 84B, 84C, and 84D) for selective engagement of remote control units (81A, 81B, 81C, and 81D) and an internal cell (86) in which accessories (92, 94) are storable. Fastener means (80) provided on wall members forming the cells facilitate secure mounting of remote control units within the cell, and also permit selective removal of remote control units.

In U.S. Pat. No. 4,856,658 to Novak, a holder assembly for remote control units used with television sets, recorders, stereos, home entertainment centers and the like and comprising an adjustably sized control unit holder adapted to be interconnected with other similarly constructed holders.

In U.S. Pat. No. 4,739,897 to Butler, a holder for a remote control unit is provided and consists of a floor panel disposed between and spanning a pair of spaced side panels, a front panel and a rear panel forming therebetween a remote control unit receiving compartment to receive and position the remote control unit. A lower compartment is formed beneath the floor panel so that batteries for the remote control unit can be stored within. A pair of holders can be secured together in a back-to-back relationship for holding two remote control units.

A few prior art references have proposed schemes to ensure the proximity of the viewer's RC and television program schedule guide in one fixed location.

In U.S. Pat. No. 5,127,615 to Jones, a holder for accessories for electronic equipment, such as remote controls (RCs) (30) for televisions, VCRs, audio receivers, etc., and schedule or guidebooks (62) for such equipment comprises a cradle (56) of variable width and length for holding one or more RCs and an underlying holder (34) for the guidebook. The cradle comprises a plurality of L-shaped members (10U, 10L, 80U, 80L) whose long portions (12, 82) overlap to form the bottom of the cradle and are clampable together in a range of positions, e.g., by means of screws (18) or hook-and-loop (H&L) fasteners (22) or double-stick sided tape. The short portions (14, 84) of the L-shaped members stand upright in a spaced relation to form the sides of the cradle. Plural shorter L-shaped members can be used with a provision for adjustable spacing so that the length of the cradle can also be adjusted. The RC units are positioned on the floor of the cradle, side-by-side, and may be held thereto by means of H&L fasteners (24). The underlying guidebook holder may be used alone or it may be attached to the RC-holding cradle by H&L fasteners (32, 54, 79), double-stick-sided tape, or integrally. Additional holders may be stacked below the first one. It comprises a plurality of plates (36, 37, 38) with attached sides so as to form a rectangular cavity. The bottom of the cavity may be closed by end flaps (42, 46, 68) of the plates or by a clamp (70) or a torsion spring. The plates may be hinged and held together by a coil or torsion spring (72) such that they can be opened in clamshell fashion.

In U.S. Pat. No. 4,739,887 to Beach, a rack is specially designed for holding stereo and television remote control devices. The rack includes horizontally adjustable shelves and may further include either a fixed or swivel base. The rack also includes a special holder for a television guide book or the like.

In addition to the problems cited above, none of the prior art schemes provides any means by which the proximity of a given RC devise to a given program schedule guide may be ensured. Nor does any of the prior art schemes provide for some simple means by which the call letters indicated on such a guide can be readily translated into channel number with which a viewer can use to operate an RC so as to switch to a desired channel.

SUMMARY OF THE INVENTION

Broadly, the instant invention provides a portable television channel selection station with a novel channel designator incorporated into it.

More specifically, the invention provides a television channel selection station which includes a substantially rectangular planar member, an arrangement for attaching a program schedule guide having a column of television station call letter designation data indicia along the at least one page edge of it, opposite the folds of the guide, to the member, a channel designator on the station but separate from the member, but designed to slidably engage relative to the member in a left or right dimensional displacement, and/or up or down dimensional displacement, positioned to the right, of an attached program schedule guide; and, a scheme for attaching a remote control to the member.

Commonly a viewer will receive television program schedule guide which identifies television channels only by their call letters. Thus, there exists a long felt need for some simple means by which the call letters indicated on such a guide can be readily translated into channel number with which a viewer can use to operate an RC so as to switch to a desired channel.

The more important features of the invention have been broadly outlined above, in order that the detailed description that follows may be better understood; and in order for the present contribution to the art may be better appreciated. There are additional features of the invention that will be described hereinafter and which form the subject matter of the appended claims. Those of ordinary skill in the art will appreciate that the conception upon which this disclosure is based may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

Further, the purpose of the instant abstract is to enable the U.S. Patent and Trademark office and the public generally, and especially the scientists, engineers and practitioners in the art who are not familiar with patent or legal terms or phraseology, to determine quickly from a cursory inspection of it, the technical disclosure of the patent application. The abstract is neither intended to define the invention of the instant patent application, which is measured by the claims, nor is it intended in any manner to be limiting as to the scope of the instant invention.

Accordingly, the invention provides various objects and advantages including a conspicuous easily locatable device storing and keeping at least One (1) RC unit in an organized, neat, and easily and accessible manner. At the same time, the invention also provides a way to store and keep at least One (1) television program guide associated with such RC unit, in the same manner. Still further at the same time, a mode for presenting advertising indicia to the viewer, is provided.

In light of the foregoing, it is therefore an object of the instant invention to provide a new and improved compact portable television channel selection station which has all of the advantages of the prior art and none of its disadvantages.

It is another object of the instant invention to provide a new and improved compact portable television channel selection station which may be easily and efficiently manufactured and marketed.

It is another object of the instant invention to provide a new and improved compact portable television channel selection station which is of a durable and reliable construction.

It is another object of the instant invention to provide a new and improved compact portable television channel selection station which can be manufactured at low cost with regard to both labor and materials, and which accordingly can be sold at a low cost or given as a promotional advertisement gift to members of the consuming public, thus promoting commerce.

It is a further object of the instant invention to provide a new and improved compact portable television channel selection station which provides at least some of the advantages of the prior art schemes, while simultaneously eliminating at least some of the disadvantages of them.

It is a further object of the instant invention to provide a new and improved compact portable television channel selection station which is particularly designed for accommodating stereo and television remote control (RC) devises.

It is an object of the instant invention to provide a portable television channel selection station which, although portable, is sufficiently conspicuous so as to not be easily misplaced.

It is a further object of the instant invention to provide a portable television channel selection station which can be used as a low cost advertisement promotional gift.

It is a further object of the instant invention to provide a portable television channel selection station which can be used as a low cost method of presenting a television viewer with printed advertisement indicia.

It is a further object of the instant invention to provide a portable television channel selection station which, although portable, is sufficiently conspicuous so as to not be easily misplaced, which has a novel channel designator slidably fixed to it.

It is a further object of the instant invention to provide a portable television channel selection station which can be used as a low cost advertisement promotional gift.

It is a further object of the instant invention to provide a portable television channel selection station which can be used as a low cost method of presenting a television viewer with printed advertisement indicia.

Other objects, features, and advantages of the instant invention, in its details of construction and arrangement of parts, will be seen from the above, from the following description of the preferred embodiment when considered in light of the drawings and the appended claims.

BRIEF DESCRIPTION OF THE DRAWINGS

FIG. 1 shows the member and element of the instant invention prior to their slidable engagement.

FIG. 2 shows the member and element of the instant invention in their slidable engagement.

FIG. 3 shows the member and element of the instant invention in their slidable engagement with and attached program schedule guide opened to a page having a column of television station call letter designation data indicia along the at least one page edge thereof.

DETAILED DESCRIPTION OF THE INVENTION

FIG. 1 shows the separated components of the television channel selection station (1) of the instant invention. It includes a substantially rectangular planar member (2). Station (1) further includes an arrangement (3) which includes three parallel slits and is the subject of copending application Ser. No. 08/825.929. The arrangement enables attachment of a program schedule guide (12) having a column of television station call letter designation data indicia (9) (see FIG. 3) along the at least one page edge thereof, opposite the folds of the guide, to the member (2). Station (1) further includes a channel designator (4) separate from the member (2), but designed to slidably engage relative to the member (2) in a left or right dimensional displacement, and/or up or down dimensional displacement to the right of an attached program schedule guide.

Further included is some arrangement, such as a velcro strip (10), for attaching an RC to the member (2). Member (2) includes a slit (6). The channel designator comprises a substantially rectangular planar element (5) having two slots (8) in each end thereof which are substantially parallel to the longitudinal dimension of the element (5). The two slots (8) are dimensioned to enable each of the slots (8) to engage an end of slit (6) of the member (2), sufficient to substantially movably fix the element (5) to the member (2) in a substantial plane having a front and a back. The right longitudinal edge of the element (5) extends from the slit (6), eclipsing a portion of the element (5), and includes two substantially parallel adjacent columns (11) of cable television data indicia of substantially equal width. The columns are generally substantially equal in length to the page edge. Element (5) may be moved up or down and/or left or right relative to the member (2) sufficient to cause at least one datum on the columns to become adjacent to at least one datum on the page edge. Slots (8) are each substantially equal to slightly more than the width of one of the columns. The station (1) further includes printed advertisement indicia (7). Preferred materials of construction for the station (1) include: fiberboard, cardboard, plastic, wood, plywood and combinations thereof.

As an alternative embodiment, the invention contemplates substituting the values of dimensional width of said slit with the values of dimensional width of said slots (8); and visa versa.

FIG. 2 shows station (1) after member (2) and element (5) are substantially fixed to each other in slidable engagement.

FIG. 3 shows the station (1) of FIG. 2, after a program schedule guide has been attached to it.

When operating the channel designator of the instant invention, the viewer simply slides the element (5) up or down and/or left or right until the desired channel number datum in one of the columns printed on element (5) is aligned with the desired television station call letter designation datum indicia along the page edge the program schedule guide. This operation graphically translates a raw station call letter datum into the appropriate station number, which the viewer can then enter into the RC, thus facilitating viewing pleasure.

As previously noted the station can be constructed of any common material or combination of materials including but not limited to: fiberboard, cardboard, plastic, wood and plywood.

When cost is the controlling factor of consideration, heavy cardboard and fiberboard the preferred materials of construction.

The preferred process when constructing the station from heavy cardboard, fiberboard or plastic, is press stamping. Typically in such a process, a rotary printing press is provided with a blanket cylinder and an impression cylinder.

The blanket is removed and replaced by a base sheet. Arranged strips are provided on this base sheet. The arrangement of the strips corresponds to the slit perforations or stamping to be produced in the paper, cardboard or fiberboard passing through the rotary printing press. A smooth protective sheet is arranged on the impression cylinder. Both sheets can be used several times and can be installed or removed rapidly by means present on the machine. After a station is produced in this manner it is thereafter finished by applying desired printed indicia by any conventional method. Decaled indicia is preferred when cost is the limiting consideration. Where cost is overridden by the desire for esthetics, silk-screening is preferred.

When cost is not a controlling factor of consideration, plastic, wood and plywood are the preferred materials of construction.

When a plastic material of construction is used, the preferred method of manufacture is hot stamp pressing. Typically in such a process, a blank is machined from the sheet of plastic to a predetermined precompensated size larger than desired to accommodate normalizing shrinkage. Typically, the blank is normalized by heating the blank in a vacuum oven. The vacuum is released from the oven by introducing dry nitrogen. A stamping die is provided. An embossing surface of the stamping die is contoured as a physical negative of the instant station and bears a physical negative of the desired surface structure of the station. The embossing surface of the stamping die is forced into engagement with the surface of the blank at a predetermined stamping pressure and for a predetermined stamping dwell time. Sufficient heat or ultrasonic energy is applied to the station generation area of the blank to provide the desired station. The embossing surface of the stamping die is removed from the station following the expiration of the stamping dwell time. The station is then removed and excess plastic is removed. As noted above, the desired printed indicia is thereafter applied by any conventional method. Decaled indicia is preferred when cost is the limiting consideration. Where cost is overridden by the desire for esthetics, silk-screening is preferred.

As an alternative but more expensive method of production for forming a somewhat more decorative station, when a plastic is selected as the material of construction, a method can be employed for producing a molded station in a predetermined spatial, non-laminate configuration. This method involves feeding the plurality of respectively dissimilar fluid components, mutually separated, into the molded article-forming structure, which contains a plate flow distributor and a non-fiber-forming shaping section. The flow distributor is made up of at least one distribution plate which is preferably thin and has micromachined on at least one facial surface of it, multiple distribution flow paths having a flow pattern effective to distribute and combine the plurality of components in the predetermined spatial, non-laminate configuration. The mutually separated components are directed through the multiple distribution flow paths sufficient to distribute and arrange the components to form a fluid structure containing the plurality of components in the predetermined spatial, non-laminate configuration. The fluid structure is then subjected to a non-fiber-forming shaping process in the shaping section to form the molded station from it. Because of the added costs of necessary hand work in their use, plywood and wood are the least preferred materials of construction. When they are selected as the material of construction, conventional sawing and milling processes are employed.

Although the invention has been described with reference to certain preferred embodiments, it will be appreciated that many variations and modifications may be made within the scope of the broad principles of the invention. Hence, it is intended that the preferred embodiments and all of such variations and modifications be included within the scope and spirit of the invention, as defined by the following claims.

I claim:

1. A television channel selection station comprising: a substantially rectangular planar member; an arrangement for attaching a program schedule guide having a column of television station call letter designation data indicia along the at least one page edge thereof, opposite the folds of said guide, to said member; a channel designator separate from said member, designed to slidably engage with said member in horizontal dimensional displacement, vertical dimensional displacement, and positioned to the right on said station of an attached program schedule guide; and, means for attaching a remote control to said member.

2. The station of claim 1, wherein said member comprises a substantially straight vertical slit; and said channel designator comprises a substantially rectangular planar element having two substantially identical slots in each end thereof which are substantially parallel to the longitudinal dimension of said element.

3. The station of claim 2, wherein said element and said two slots are dimensioned to enable the inner end of each, to engage an end of said slit, sufficient to substantially movably fix said element to said member in a substantially common plane.

4. The station of claim 3, wherein the right longitudinal edge of said element extends from said slit and eclipses a portion of said element, and includes two substantially parallel adjacent columns of cable television data indicia, each of substantially equal width to each said slot; said element being generally substantially equal in length to said one page edge, whereby said element may be moved up or down, or left or right relative to said member, sufficient to cause at least one datum on said columns to become adjacently aligned with at least one datum on said page edge.

5. The station of claim 1, wherein said means for attaching a remote control thereto, includes a hook and loop type fastening strip.

6. The station of claim 1, further comprising printed advertisement indicia on said rectangular planar member.

7. The station of claim 1, wherein said station is constructed of a material selected from the group consisting of fiberboard, cardboard, plastic, wood, plywood and combinations thereof.

8. The station of claim 1, wherein the width of said slot is substantially equal to slightly more than the width of said column.

9. In a television channel selection station which includes a substantially rectangular planar member; an arrangement for attaching a program schedule guide having a column of television station call letter designation data indicia along the at least one page edge thereof, opposite the folds of said guide, to said member; and, means for attaching a remote control to said member, the improvement comprising:

a channel designator separate from said member, but designed to slidably engage relative to said member in a horizontal displacement, or vertical dimensional displacement to the right on said station of an attached program schedule guide.

10. The station of claim 9, wherein said member comprises a substantially straight slit; and said channel designator comprises a substantially rectangular planar element having two substantially identical slots in each end thereof which are substantially parallel to the longitudinal dimension of said element.

11. The station of claim 10, wherein said element and said two slots are dimensioned to enable the inner end of each of said slots to slidably engage an end of the slit of said member, sufficient to substantially movably fix said element to said member in a substantially common plane.

12. The station of claim 11, wherein the right longitudinal edge of said element extends from said slot and eclipses a portion of said element, and includes two substantially parallel adjacent columns of cable television data indicia of substantially equal width, substantially equal in length to said one page edge; whereby said element may be moved up or down, or left or right relative to said member sufficient to cause at least one datum on said columns to become adjacent to at least one datum on said page edge.

13. The station of claim 9, wherein said means for attaching a remote control thereto, includes a hook and loop type fastening strip.

14. The station of claim 9, further comprising printed advertisement indicia on said rectangular planar member.

15. The station of claim 9, wherein said station is constructed of a material selected from the group consisting of: fiberboard, cardboard, plastic, wood, plywood and combinations thereof.

16. The station of claim 9, wherein the width of said slot is substantially equal to slightly more than the width of said column.

17. A product which includes a substantially rectangular planar member having a generally substantially straight slit therein, substantially parallel to and spaced from, one edge of said member; an arrangement for attaching a program schedule guide having a column of television station call letter designation data indicia along the at least one page edge thereof, opposite the folds of said guide, to said member; a channel designator formed of an element which includes two substantially identical slots which are dimensioned to enable an inner end of each of said slots for slidable engagement of an end of said slit of said member, sufficient to substantially movably fix said element to said member in a substantially common plane, designed to slidably engage relative to said member in a horizontal dimensional displacement, or vertical dimensional displacement, and positioned to the right on said station, of an attached program schedule guide; and, means for attaching a remote control to said member; by the process of:

providing a first and a second substantially planar rectangular work piece of a material selected from the group consisting of fiberboard, cardboard, plastic, wood, plywood and combinations thereof;

stamp pressing said first work piece to produce said member; and, stamp pressing said second work piece to produce said element.

18. The process of claim 17, further comprising the step of printing two substantially parallel adjacent columns of cable television data indicia on the right longitudinal edge of said element relative to said slidable engagement.

19. The process of claim 18, further comprising the step of printing advertising indicia on at least said rectangular planar member.

20. The process of claim 19, further comprising the step slidably engaging said element with said member sufficient to substantially movably fix said element to said member in a substantially common plane, and designed to slidably engage with said member in horizontal dimensional displacement, on vertical dimensional displacement, and positioned to the right on said station, of an attached program schedule guide.

* * * * *